United States Patent
Sakaguchi et al.

(10) Patent No.: US 8,620,554 B2
(45) Date of Patent: Dec. 31, 2013

(54) ACCELERATOR REACTION FORCE CONTROL APPARATUS

(71) Applicant: Nissan Motor Co., Ltd., Kanagawa (JP)

(72) Inventors: Shigeyuki Sakaguchi, Yokohama (JP);
Masao Shiomi, Sagamihara (JP);
Masahiro Omori, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/856,610

(22) Filed: Apr. 4, 2013

(65) Prior Publication Data

US 2013/0226404 A1  Aug. 29, 2013

Related U.S. Application Data

(62) Division of application No. 12/785,720, filed on May 24, 2010, now Pat. No. 8,457,855.

(30) Foreign Application Priority Data

May 25, 2009  (JP) ................................ 2009-124799

(51) Int. Cl.
*G06F 7/70*   (2006.01)
*G06F 19/00*  (2011.01)
*G06G 7/00*   (2006.01)
*G06G 7/76*   (2006.01)

(52) U.S. Cl.
USPC ............... 701/70; 701/69; 701/71; 701/79; 701/110; 303/138; 303/121; 340/467

(58) Field of Classification Search
None
See application file for complete search history.

(56) References Cited

U.S. PATENT DOCUMENTS 4,070,562 A * 1/1978 Kuno et al. ............ 303/138
5,699,251 A * 12/1997 Mori et al. .............. 701/97

(Continued)

FOREIGN PATENT DOCUMENTS

CN  1986306    6/2007
CN  101032956  9/2007

(Continued)

OTHER PUBLICATIONS

An English translation of the Japanese Notification of Reason for Rejection of corresponding Japanese Application No. 2009-124799, issued on Aug. 6, 2013.

(Continued)

*Primary Examiner* — Ryan Zeender
*Assistant Examiner* — Fateh Obaid
(74) *Attorney, Agent, or Firm* — Global IP Counselors, LLP (57) ABSTRACT

An accelerator reaction force control apparatus has an accelerator position detecting device that detects an accelerator position and a reaction force varying device that varies a reaction force of an accelerator. The reaction force varying device increases the accelerator's reaction force beyond a base reaction force in response to the accelerator position being equal to or larger than a reaction force increase threshold, and decreases the accelerator's reaction force toward the base reaction force in response to the accelerator position becoming equal to or smaller than a reaction force increase cancellation threshold after the reaction force has been increased beyond the base reaction force. The reaction force varying device varies a reaction force decrease rate at which the accelerator's reaction force is decreased based on an accelerator position change condition existing at a time when the accelerator position becomes equal to or smaller than the reaction force increase cancellation threshold.

12 Claims, 6 Drawing Sheets

(56) References Cited

U.S. PATENT DOCUMENTS

| | | | |
|---|---|---|---|
| 6,266,602 B1 * | 7/2001 | Yamaura | 701/80 |
| 6,272,418 B1 * | 8/2001 | Shinmura et al. | 701/72 |
| 6,393,352 B2 * | 5/2002 | Sielagoski et al. | 701/96 |
| 6,408,241 B1 * | 6/2002 | Sielagoski et al. | 701/96 |
| 6,415,215 B1 * | 7/2002 | Nishizaki et al. | 701/70 |
| 8,370,025 B2 * | 2/2013 | Ono et al. | 701/42 |
| 2005/0279554 A1 * | 12/2005 | Kobayashi et al. | 180/197 |
| 2007/0074918 A1 * | 4/2007 | Meyer | 180/65.3 |
| 2007/0213915 A1 * | 9/2007 | Tange et al. | 701/96 |
| 2012/0059563 A1 | 3/2012 | Sakaguchi et al. | |

FOREIGN PATENT DOCUMENTS

| | | |
|---|---|---|
| JP | H3-217627 | 9/1991 |
| JP | H9-249043 | 9/1997 |
| JP | H10-166890 | 6/1998 |
| JP | 2003-025870 | 1/2003 |
| JP | 2003-120339 | 4/2003 |
| JP | 2004-009755 | 1/2004 |
| JP | 2004-189142 A | 7/2004 |
| JP | 2004-314871 | 11/2004 |
| JP | 2005-132225 | 5/2005 |
| JP | 2007-76468 | 3/2007 |
| JP | 2007-076469 | 3/2007 |
| JP | 2007-126038 | 5/2007 |

OTHER PUBLICATIONS

An English tranlsation of the Chinese Office Action of corresponding Chinese Application No. 201010186346.7, issued on Aug. 1, 2012.

The exteded European Search Report of corresponding European Application No. 10162969.9-2421, dated Oct. 26, 2010.

An English translation of the Chinese Written Notification of Opinion Upon the Second Examination of corresponding Chinese Application No. 201010186346.7, issued on Mar. 29, 2013.

* cited by examiner

ACCELERATOR REACTION FORCE CONTROL APPARATUS

CROSS-REFERENCE TO RELATED APPLICATIONS

This application is a divisional of U.S. patent application Ser. No. 12/785,720, filed May 24, 2010, and claims priority to Japanese Patent Application No. 2009-124799, filed May 25, 2009. The entire disclosures of U.S. patent application Ser. No. 12/785,720 and Japanese Patent Application No. 2009-124799 are hereby incorporated herein by reference.

BACKGROUND

1. Field of the Invention

The present invention generally relates to an accelerator reaction force control apparatus.

2. Background Information

An accelerator pedal reaction force control apparatus has been disclosed in which when the accelerator position becomes equal to or larger than a prescribed reaction force increase threshold value, a reaction force of the accelerator pedal is increased beyond a base reaction force until the accelerator position becomes equal to or smaller than a prescribed reaction force increase cancellation threshold value. Then, when the accelerator position becomes equal to or smaller than the prescribed reaction force increase cancellation threshold value, the increased reaction force of the accelerator pedal is returned to the base reaction force. An example of such an accelerator pedal reaction force control apparatus is disclosed in Japanese Laid-Open Patent Publication No. 2003-120339.

SUMMARY

Whether the depression reaction force of an accelerator pedal will be increased is not determined solely based on the accelerator position. In some cases, it may be determined based on other driving conditions. For example, after the depression reaction force of the accelerator pedal has been increased, it may be returned to a smaller reaction force even though the accelerator position has not decreased. In such a case, if the increased depression reaction force is returned suddenly, it could cause a driver to inadvertently depress the accelerator pedal too deeply.

One object of the present disclosure is to provide an accelerator pedal reaction force control apparatus that increases an accelerator pedal reaction force to a value larger than a base reaction force when an accelerator position becomes equal to or larger than a prescribed reaction force increase threshold and that decreases the accelerator pedal reaction force toward the base reaction force when the accelerator position becomes equal to or smaller than a prescribed reaction force increase cancellation threshold. The accelerator pedal reaction force control apparatus preferably varies a rate at which the accelerator pedal reaction force is decreased based on an accelerator position change condition existing when the accelerator position becomes equal to or smaller than the reaction force increase cancellation threshold.

In view of the above technology and one aspect of the present disclosure, an accelerator reaction force control apparatus is provided that comprises an accelerator position detecting device and a reaction force varying device. The accelerator position detecting device detects an accelerator position. The reaction force varying device varies a reaction force of an accelerator. The reaction force varying device increases the reaction force of the accelerator beyond a base reaction force in response to the accelerator position being equal to or larger than a prescribed reaction force increase threshold. The reaction force varying device decreases the reaction force of the accelerator toward the base reaction force in response to the accelerator position becoming equal to or smaller than a prescribed reaction force increase cancellation threshold after the reaction force has been increased beyond the base reaction force. The reaction force varying device further varies the reaction force decrease rate at which the reaction force of the accelerator is decreased based on an accelerator position change condition existing at a time when the accelerator position becomes equal to or smaller than the reaction force increase cancellation threshold.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
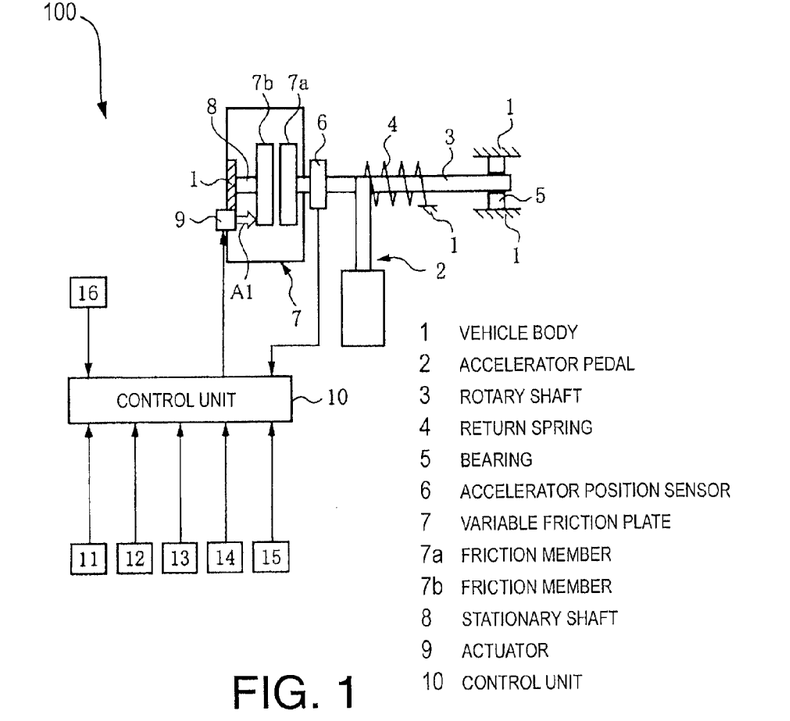
FIG. 1 is a simplified schematic view of a system configuration and a reaction-force changing mechanism of an accelerator pedal reaction force control apparatus according to one embodiment.

Referring initially to FIG. 1, a schematic system diagram of an accelerator pedal reaction force control apparatus 100 is illustrated in accordance with one embodiment. The accelerator pedal reaction force control apparatus 100 is basically configured to variably control a reaction force (operating force) of an accelerator pedal 2 provided in a vehicle body 1 of a vehicle. While the terms "accelerator" and "accelerator pedal" are used throughout this specification, it should be understood from this disclosure that such terms should not be limited to any particular embodiment or type of input device. In particular, while a "pedal" inside the passenger compartment is described, it should be understood from this disclosure that the "accelerator" can be a device in the engine compartment responsive to electrical, hydraulic or mechanical signals produced by a pedal (or other input device) in the passenger compartment. Additionally, while the device in the passenger compartment is described as a pedal, it should be understood from this disclosure that various other regulating devices (e.g., levers, switches, buttons, etc.) can be used as an "accelerator" or as devices that signal an "accelerator."

As explained below, the apparatus 100 includes detects a position (depression amount) of the accelerator pedal 2 and changing a reaction force of the accelerator pedal 2 from a base reaction force. As will be explained later, the apparatus 100 is configured to increase the reaction force of the accelerator pedal 2 beyond the base reaction force when the position of the accelerator pedal 2 is larger than a prescribed accelerator position threshold corresponding to a prescribed reaction force increase threshold that constitutes a first position threshold. In this way, the apparatus 100 prevents the accelerator pedal 2 from being depressed too deeply when a reaction force of the accelerator pedal 2 is returned toward a base reaction force after having been increased beyond the base reaction force. As will be explained later, the rate at which the reaction force of the accelerator pedal 2 is decreased is varied based on an accelerator position change condition. As a result, when the reaction force of the accelerator pedal 2 is returned to the base reaction force, the tendency of a driver to inadvertently depress the accelerator pedal too deeply in response to the decreased reaction force can be suppressed.

Figure 2:
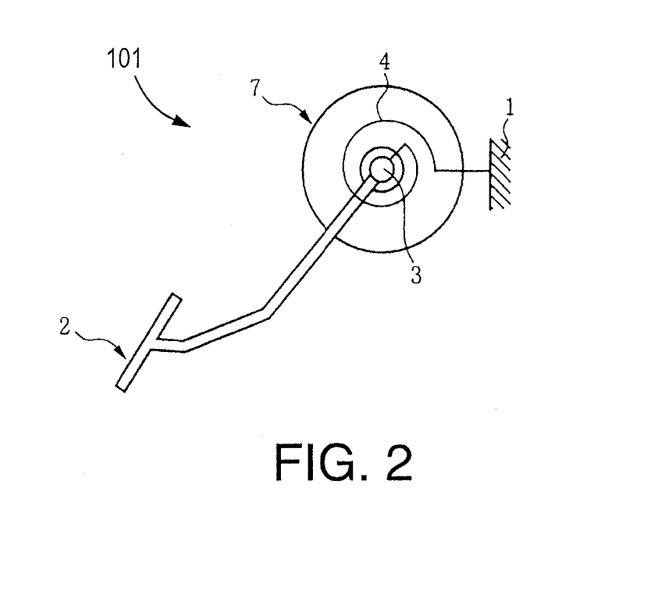
FIG. 2 is a simple sketch of a reaction-force changing mechanism according to the illustrated embodiment.

FIG. 2 is sketch of a reaction-force changing mechanism 101 according to the illustrated embodiment. As shown in FIGS. 1 and 2, the accelerator pedal 2 is provided on a rotating shaft 3 such that the accelerator pedal 2 pivots about a center axis of the rotating shaft 3. A return spring 4 serves to apply a force (reaction force) against the accelerator pedal 2 in a direction of closing a throttle valve (decreasing accelerator position). One end of the return spring 4 is fixed to the vehicle body 1 and the other end is fixed to the rotating shaft 3. One end of the rotating shaft 3 is rotatably supported on the vehicle body 1 with a bearing 5 and an accelerator position sensor 6 is provided near the other end of the rotating shaft 3. The accelerator position sensor 6 serves as an accelerator position detecting device and outputs an accelerator position signal APS.

In the illustrated embodiment, the depression amount or accelerator position of the accelerator pedal 2 and an opening degree of a throttle valve (not shown) of an internal combustion engine (not shown) are linked such that the opening degree of the throttle valve increases and decreases in accordance with the depression amount of the accelerator pedal 2. In short, a fuel injection amount (and, thus, a fuel consumption amount) increases and decreases according in accordance with the accelerator position.

The reaction-force changing mechanism 101 includes a variable friction plate 7 having a pair of friction members 7a and 7b arranged facing opposite each other and configured to apply a frictional force against rotation of the rotating shaft 3. One of the friction members 7a is mechanically coupled to an end portion of the rotating shaft 3. The other friction member 7b is non-rotatably supported on a stationary shaft 8 with splines or the like such that it can move freely in an axial direction along the stationary shaft 8. The stationary shaft 8 is fixed to the vehicle body 1. Additionally, an actuator (e.g., an electromagnetic solenoid) 9 is fixed to the vehicle body 1 and serves to apply a force against the friction element 7b toward the friction element 7a.

The variable friction plate 7 is configured such that a frictional force between the friction members 7a and 7b is variable controlled by operating the actuator 9 so as to move the friction member 7b in an axial direction (direction indicated with the arrow A1 in FIG. 1). The operation of the actuator 9 is controlled by a control unit 10. In short, the frictional force applied to the rotating shaft 3. Thus, the reaction force experienced when the accelerator pedal 2 is operated can be varied by the manner in which the control unit 10 controls the operation of the actuator 9. Thus, the control of the actuator 9 by the control unit 10, as discussed below, to vary the reaction-force changing mechanism 101 constitutes one example of a reaction force varying device or a reaction force controller.

In addition to receiving an input signal from the aforementioned accelerator position sensor 6 (which detects a position of the accelerator pedal 2), the control unit 10 receives input signals from such sensors as an acceleration sensor that detects a road grade based on a slope of the vehicle, a vehicle speed sensor 12 that detects a vehicle speed, a passenger (seat pressure) sensor 13 that is installed inside a seat (not shown) of the vehicle and that detects if a passenger is in the vehicle, and a gear position sensor that detects a gear ratio of a transmission. Additionally, the control unit 10 receives information from a car navigation system 15 that acquires a current position of the vehicle, map information regarding a vicinity of the current position, and such road information as the legal speed limit of the road currently traveled on. The control unit 10 also receives a signal from a laser radar 16 that detects a headway distance between the vehicle in which the apparatus is installed and a preceding vehicle.

The transmission can be, for example, a continuously variable transmission that varies the gear ratio in a continuous manner, an automatic transmission having a torque converter and a step-shifting auxiliary gear changing mechanism, or a manual transmission. In the case of a continuously variable transmission, the gear ratio can be calculated as a ratio of a rotational speed on the input shaft side and a rotational speed on the output shaft side of the transmission.

Figure 3:
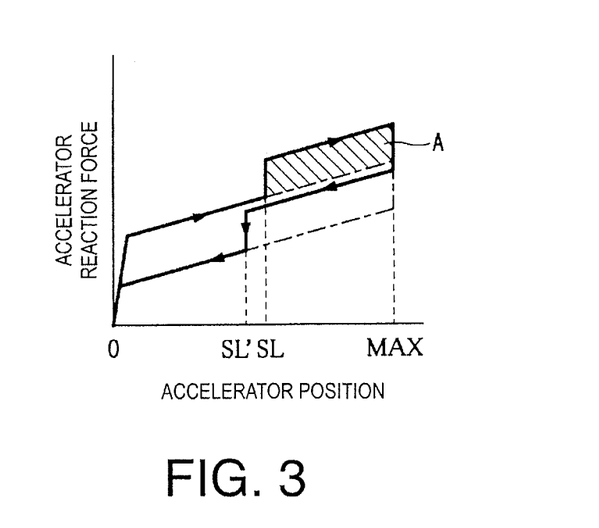
FIG. 3 is a characteristic diagram showing an accelerator pedal reaction force characteristic according to the illustrated embodiment.

FIG. 3 is a simple characteristic diagram showing a reaction force characteristic of the accelerator pedal 2 according to the embodiment. The accelerator pedal 2 is provided with a basic reaction force that has an appropriate hysteresis with respect to operation of the accelerator pedal 2 in a depression direction (direction of increasing throttle valve opening) and in a release direction (direction of decreasing throttle valve opening) and increase substantially proportionally with respect to the accelerator position. This basic reaction force is called a "base reaction force." When the accelerator pedal 2 is operated in the direction of increasing throttle valve opening, i.e., depressed, and the accelerator position exceeds a prescribed accelerator position threshold (indicated as SL in FIG. 3), the reaction force of the accelerator pedal 2 is increased beyond the depression-side base reaction force (indicated with a single-dot chain line in FIG. 3) in a step-like fashion such that further depression is suppressed. In other words, a reaction force increase amount A is added on top of the depression-side base reaction force.

The increase of the reaction force of the accelerator pedal 2 is not cancelled immediately when the operation direction of the accelerator pedal 2 is switched from the depression direction to the release direction. Instead, the increase is cancelled (i.e., the reaction force increase amount A is removed) when the accelerator position has decreased to a value equal to or smaller than a prescribed reaction force increase cancellation threshold (indicated as SL' in FIG. 3) that is smaller than the accelerator position threshold (indicated as SL in FIG. 3). The prescribed reaction force increase cancellation threshold constitutes a second position threshold.

According to one embodiment, as discussed below, the control of the actuator 9 by the control unit 10 (the reaction force varying device or reaction force controller), which varies or adjusts the reaction force of the accelerator pedal 2, is configured to set the first position threshold based on an operating state and set the second position threshold that is equal or less than the first position threshold. The control unit 10 increases the reaction force when the accelerator passes the first position threshold. The control unit 10 reduces the reaction force when the accelerator pedal 2 is reduced to a position below the second position threshold from a position above the first position threshold. The control unit 10 also varies a reaction force decrease rate at which the reaction force is decreased based on a change condition of the accelerator position existing at a time when the accelerator pedal 2 is reduced to a position below the second position threshold.

Figure 4:
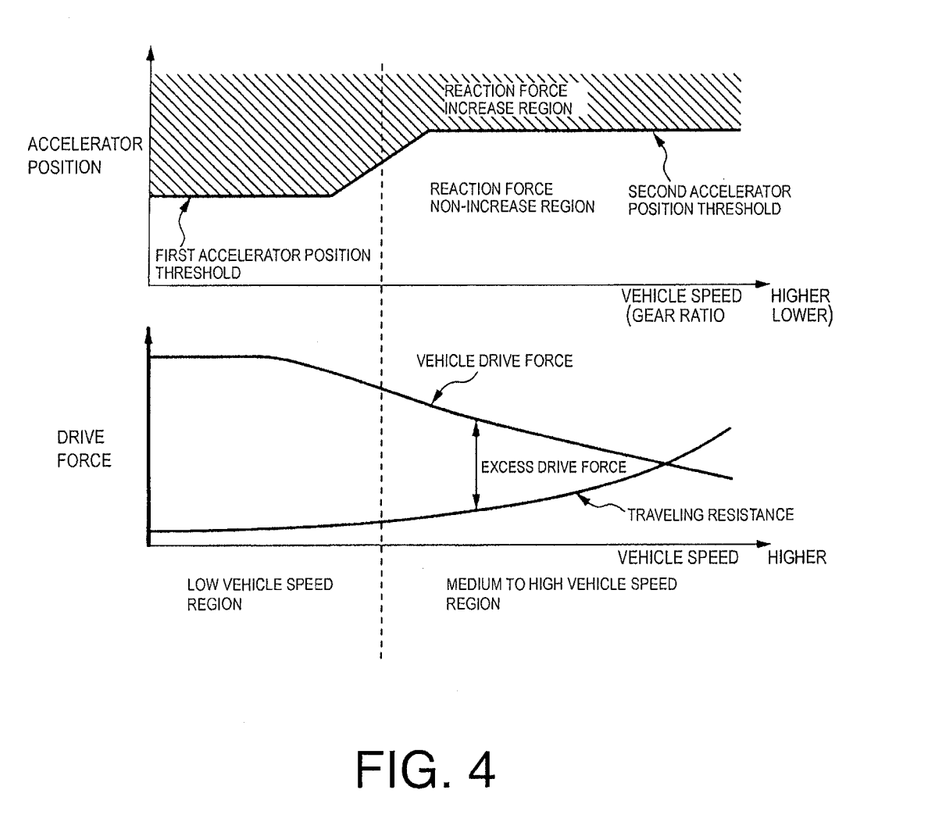
FIG. 4 is a simple plot of an accelerator position threshold, a full throttle drive force, and a traveling resistance versus a vehicle speed.

In this embodiment, the control unit 10 varies the accelerator position threshold at which the reaction force of the accelerator pedal 2 is increased in accordance with a vehicle speed as shown in FIG. 4. More specifically, a smaller first accelerator position threshold is selected when the vehicle speed is lower and a larger second accelerator position threshold is selected when the vehicle speed is higher. In other words, when the vehicle speed is lower, the reaction force is increased at a smaller accelerator position such that a larger reaction force increase region is secured, i.e., a larger difference is secured between an accelerator position corresponding to a fully open throttle and the accelerator position threshold. Conversely, when the vehicle speed is higher, the reaction force is not increased until a larger accelerator position is reached such that a larger reaction force non-increase region is secured, i.e., a larger difference is secured between the accelerator position threshold and an accelerator position corresponding to a fully closed throttle.

As shown in FIG. 4, in a region of vehicle speeds between a vehicle speed corresponding to the first accelerator position threshold and a vehicle sped corresponding to the second accelerator position threshold, the accelerator position threshold changes in a continuous manner from the first accelerator position threshold to the second accelerator position threshold in accordance with the vehicle speed.

FIG. 4 is a simple plot of an accelerator position threshold, a vehicle drive force characteristic for a fully open throttle that assumes an appropriate gear shifting control, and a traveling resistance versus a vehicle speed on a horizontal axis. The diagonally hatched region of the figure indicates a region where reaction force increase control is executed when the accelerator position moves from a region of smaller values into the hatched region. As shown in the figure, the vehicle drive force obtained with a fully open throttle is large in a region of low vehicle speeds (including starting into motion from a stopped state) because the gear ratio of the transmission is large. Since even a small operation of the accelerator pedal will result in a large change in the vehicle drive force, a driver can easily cause an unnecessarily large drive force to be generated, thus resulting in unnecessary acceleration. Therefore, when the vehicle speed is in a low vehicle speed region, the accelerator position threshold is set to a comparatively small first accelerator position threshold such that the reaction force of the accelerator pedal 2 is increased at a comparatively small accelerator position and over-depression of the accelerator pedal 2 by a driver is prevented aggressively. As a result, the overall fuel consumption of the vehicle can be reduced.

Meanwhile, in a region of medium to high vehicle speeds, the vehicle drive force obtained with a fully open throttle is smaller and, thus, the amount of increase of the vehicle drive force with respect to a unit amount of accelerator operation is smaller because the gear ratio of the transmission is small. Consequently, it is more difficult for unnecessary acceleration to occur. Also, in a region of medium to high vehicle speeds, the vehicle drive force required to maintain a constant speed is larger because a traveling resistance (air resistance and rolling resistance) of the vehicle is larger. Additionally, an excess drive force expressed as a difference between a vehicle drive force obtained with a fully open throttle and a traveling resistance is smaller. If the reaction force of the accelerator pedal 2 is increased under such conditions, then it will not be possible to depress the accelerator pedal 2 further and the driver will not be able to accelerate the vehicle. Therefore, in a medium to high vehicle speed region, the accelerator position threshold is set to a comparatively large second accelerator position threshold such that the accelerator pedal 2 is allowed to be depressed rapidly with the base reaction force up to a comparatively large accelerator position and smooth vehicle acceleration can be achieved.

The accelerator position threshold is also varied in a continuous fashion between the first accelerator position threshold and the second accelerator position threshold in accordance with changes in the vehicle speed such that a driver can operate the accelerator pedal 2 without experiencing a feeling that something is odd about the behavior of the accelerator pedal 2. That is, since the accelerator position threshold does not change suddenly in a step-like fashion at a prescribed vehicle speed when the vehicle speed is transitioning from a low speed region to a medium to high speed region, a driver can operate the accelerator pedal 2 without experiencing a feeling that something is odd. Although in this illustrated embodiment there are two stages of accelerator position thresholds, i.e., a first accelerator position threshold and a second accelerator position threshold, the present disclosure is not limited to two stages and it is acceptable to set the accelerator position threshold in multiple stages. It is also acceptable to set the accelerator position threshold in a continuously variable manner across all vehicle speed regions.

In this illustrated embodiment, the vehicle speed is used as a parameter indicating the traveling resistance of the vehicle and a vehicle drive force characteristic corresponding to a fully open throttle such that the accelerator position threshold is essentially set based on both a traveling resistance of the vehicle and a vehicle drive force characteristic for a fully open throttle. However, it is acceptable to set the accelerator position threshold based on only one of these two factors. For example, it is acceptable to use the gear ratio of the transmission as a parameter indicating the vehicle drive force characteristic corresponding to a fully open throttle and set the accelerator position threshold based on the current gear ratio. Although the vehicle drive force characteristic for a fully open throttle shown in FIG. 4 is for, for example, continuously variable transmission, the vehicle drive force versus vehicle speed characteristic is basically the same when the vehicle is equipped with a manual transmission or an automatic transmission having a step-shifting auxiliary gear changing mechanism. That is, the vehicle drive force is larger in a low vehicle speed region because the gear ratio is larger, and the vehicle drive force is smaller in a high vehicle speed region because the gear ratio is smaller. For example, when a step-shifting automatic transmission is used, the accelerator position threshold can be set by selecting from a plurality of different accelerator position thresholds corresponding to the different gear ratios, respectively.

The accelerator position threshold can also be set in a variable fashion based on a parameter other than the vehicle speed that indicates the traveling resistance. For example, the traveling resistance of the vehicle increases when the grade of the road is larger (assuming a climbing grade is positive). Thus, the accelerator position threshold can be set to be larger when the road grade is smaller than when the road grade is larger. The size of a traveling resistance obtained based on the road grade or other parameter can be used instead of a traveling resistance based on the vehicle speed (chiefly air resistance and rolling resistance) or in combination with a traveling resistance based on the vehicle speed.

It is also possible to use a detection value from an acceleration sensor 11 to detect a grade of a road. Furthermore, if a current position and map information regarding an area surrounding the current position can be obtained from a car navigation system 17, then a grade of a road at the current position can be detected based on the map information.

In this illustrated embodiment, when the reaction force of the accelerator pedal 2 is in a state of having been increased beyond the base reaction force, the size of the reaction force is decreased to as to be returned to the size of the base reaction force when the accelerator position becomes equal to or smaller than a reaction force increase cancellation value. More specifically, in this embodiment, when the accelerator position becomes equal to or smaller than the reaction force increase cancellation threshold while reaction force increase control is in progress, the reaction force of the accelerator pedal 2 is decreased to the base reaction force and the rate at which the size of the reaction force of the accelerator pedal 2 is decreased is varied based on an accelerator position change state existing at the time when the accelerator position became equal to or smaller than the reaction force increase cancellation threshold. In this embodiment, the reaction force increase cancellation threshold is varied according to the vehicle speed. More specifically, as shown in FIG. 3, the reaction force increase cancellation threshold is set to a value (SL') that is smaller by a prescribed amount than an accelerator position threshold (SL) at which reaction force increase control would be started at the same vehicle speed.

With this embodiment, the rate at which the reaction force of the accelerator pedal 2 is decreased is varied based on an accelerator position change condition. As a result, when the reaction force of the accelerator pedal 2 is returned to the base reaction force, the tendency of a driver to inadvertently depress the accelerator pedal 2 too deeply in response to the decreased reaction force can be suppressed.

Figure 5:
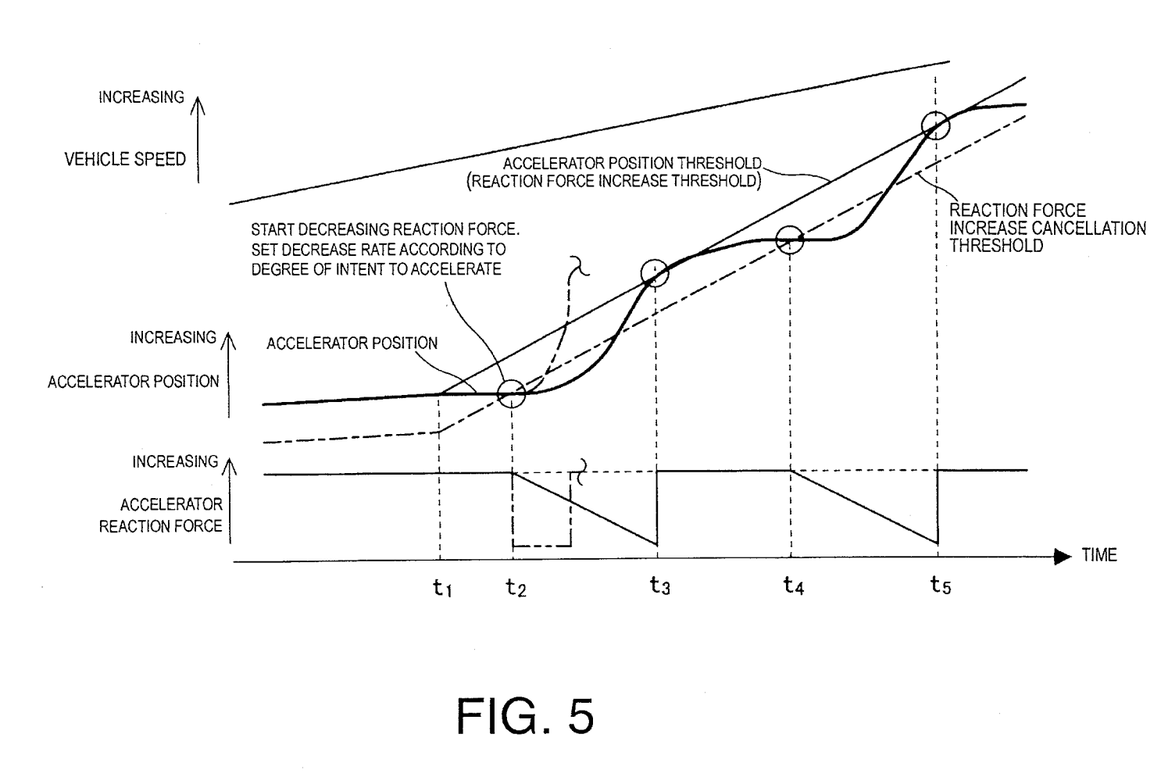
FIG. 5 is a time chart illustrating decreasing the size of an accelerator pedal reaction force toward the size a base reaction force in accordance with the embodiment.

FIG. 5 is a time chart illustrating a case in which the reaction force of the accelerator pedal 2 is decreased toward a base reaction force when the accelerator position is constant and the accelerator position has become equal to or smaller than a reaction force increase cancellation threshold.

In FIG. 5, before a time t1, the accelerator position is equal to or larger than an accelerator position threshold and the reaction force of the accelerator pedal 2 is increased beyond a depression-side base reaction force. During a period from the time t1 to immediately before a time t2, the accelerator position is constant and the accelerator position threshold and a reaction force increase cancellation threshold are increased as the vehicle speed increases. At the time t2, the accelerator position becomes equal to or smaller than the reaction force increase cancellation value and the control unit 10 starts to reduce the reaction force of the accelerator pedal 2 so as to return the size of the reaction force of the accelerator pedal 2 toward a base reaction force from a value to which it was increased by the reaction force increase control. If the increase amount of the reaction force of the accelerator pedal 2 were suddenly removed at the time t2, as indicated with a double-dot chain line in FIG. 5, then a driver could possibly depress the accelerator pedal 2 too deeply in reaction to the decreased reaction force. During a period from immediately after the time t2 until immediately before a time t3, the accelerator position and the vehicle speed increase as the reaction force of the accelerator pedal 2 decreases and the accelerator position threshold and the reaction force increase cancellation threshold increase as the vehicle speed increases. At the time t3, the accelerator position becomes equal to or larger than the accelerator position threshold and the control unit 10 increases the reaction force of the accelerator pedal 2 beyond a depression-side base reaction force, which is a base reaction force employed when the accelerator position is increasing. During a period from immediately after the time t2 until immediately before a time t4, the accelerator position threshold and the reaction force increase cancellation threshold increase as the vehicle speed increases. At the time t4, the accelerator position becomes equal to or smaller than the reaction force increase cancellation value and the control unit 10 starts to reduce the reaction force of the accelerator pedal 2, which had been increased by the reaction force increase control. During a period from immediately after the time t4 until immediately before a time t5, the accelerator position and the vehicle speed increase as the reaction force of the accelerator pedal 4 decreases and the accelerator position threshold and the reaction force increase cancellation threshold increase as the vehicle speed increases. At the time t5, the accelerator position is equal to or larger than an accelerator position threshold and the size of the reaction force of the accelerator pedal 2 is increased beyond the depression-side base reaction force.

In FIG. 5, the rate at which the size of the reaction force of the accelerator pedal 2 is decreased toward the size of a base reaction force from a size to which it was increased by the reaction force increase control is varied based on an accelerator position change condition existing a time when the accelerator position becomes equal to or smaller than the reaction force increase cancellation threshold (exemplified by the times t2 and t4). In other words, the rate at which the reaction force of the accelerator pedal 2 is decreased toward the base reaction force is changed in response to a degree of intent to acceleration held by the driver when the accelerator position becomes equal to or smaller than the reaction force increase cancellation threshold.

Figure 6:
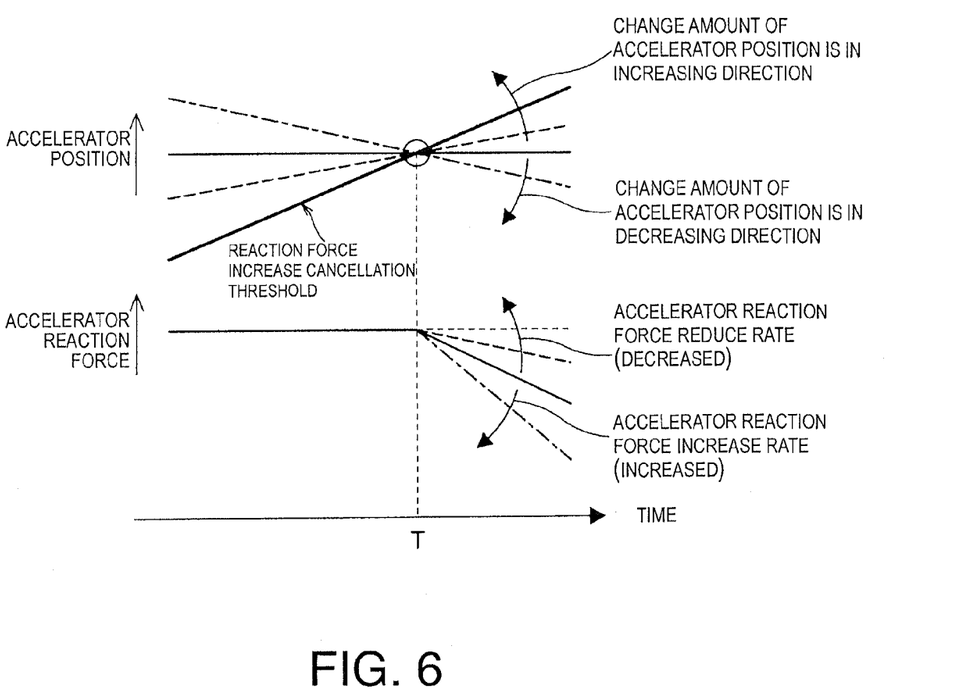
FIG. 6 is a simple diagram illustrating a correlation relationship between a change amount of an accelerator position and a decrease rate of an accelerator pedal reaction force when the size of the accelerator pedal reaction force is decreased toward the size of a base reaction force.

A degree of intent to accelerate held by a driver is determined, for example, based on a change amount of the accelerator position as shown in FIG. 6. FIG. 6 is a simple diagram showing three ways the reaction force of the accelerator pedal 2 is changed in response to three different change amounts of the accelerator position. In the figure, an accelerator position (constant accelerator position) indicated with a solid line corresponds to a reaction force of the accelerator pedal 2 indicated with a solid line, an accelerator position (increasing accelerator position) indicated with a broken line corresponds to a reaction force of the accelerator pedal 2 indicated with a broken line, and an accelerator position (decreasing accelerator position) indicated with a single-dot chain line corresponds to a reaction force of the accelerator pedal 2 indicated with a single-dot chain line.

A decrease rate at which the reaction force of the accelerator pedal 2 is decreased toward a base reaction force is determined based on a change rate of the accelerator position occurring at the time T indicated in FIG. 6, which is equivalent to the time t2 or the time t4 shown in FIG. 5.

More specifically, if the accelerator position is increasing at the time T, then the decrease rate of the reaction force of the accelerator pedal 2, i.e., the rate at which the reaction force is returned toward the base reaction force, is set to a comparatively slow rate (slower than a decrease rate used when the accelerator position is constant). Conversely, if the accelerator position is decreasing at the time T, then the decrease rate of the reaction force of the accelerator pedal 2 is set to a comparatively fast rate (faster than a decrease rate used when the accelerator position is constant).

The larger the change amount of the accelerator position is in an increasing direction (i.e., the more accelerator pedal 2 is being moved in a depression direction), the higher the possibility that the driver will further depress the accelerator pedal 2 in order to accelerate is determined to be and the reaction force of the accelerator pedal 2 is decreased at a slower rate. Conversely, larger the change amount of the accelerator position is in an decreasing direction (i.e., the more accelerator pedal 2 is being moved in a release direction), the lower the possibility that the driver will depress the accelerator pedal 2 in order to accelerate is determined to be and the reaction force of the accelerator pedal 2 is decreased at a faster rate.

When the driver has a higher degree of intent to accelerate, there is a higher possibility that the driver will depress the accelerator pedal 2 farther when the reaction force of the accelerator pedal 2 is decreased toward the base reaction force from an increased state. Thus, by setting the decrease rate of the reaction force of the accelerator pedal 2 based on the driver's degree of intent to accelerate, a tendency of the driver to depress the accelerator pedal 2 into a region where the fuel efficiency is poor can be suppressed. Meanwhile, when the change amount of the accelerator position is in a decreasing direction, the driver will not over-depress the accelerator pedal 2 even if the reaction force of the accelerator pedal 2 is decreased to the base reaction force all at once. Therefore, the reaction force of the accelerator pedal 2 can be reduced rapidly from the increased reaction force resulting from the reaction force increase control.

Although in this embodiment the rate at which the reaction force of the accelerator pedal 2 is decreased is set in a continuous fashion based on a change amount of the accelerator position, it is also acceptable to determine a degree of intent of the driver to accelerate in a graduated fashion based on the change amount of the accelerator position and determine a rate at which the reaction force of the accelerator pedal 2 will be decreased in stages (step-like fashion) based on the graduated degrees of intent to accelerate.

If it is predicted that the driver will further depress the accelerator pedal 2 at a point in time when the accelerator position has become equal to or below the reaction force increase cancellation threshold, then it is highly probable that the driver will further depress the accelerator pedal 2 after the reaction force of the accelerator pedal 2 (which has been increased beyond the base reaction force) is decreased. Therefore, in such a case, the rate of decrease of the reaction force of the accelerator pedal 2 can be set to a slower rate.

For example, the driver is more likely to increase the depression amount of the accelerator pedal 2 after the reaction force of the accelerator pedal 2 is decreased when the engine load is high (such as when climbing a hill, traveling with a large number of passengers, or when carrying a heavy load), when the headway distance with respect to a preceding vehicle is large, and when the vehicle speed is far from the legal speed limit.

Therefore, when it is predicted that the accelerator pedal 2 will be depressed, the rate at which the reaction force of the accelerator pedal 2 is decreased so as to return it to the base reaction force after having been increased by the reaction force increase control is set to a slower rate. As a result, over-depression of the accelerator pedal 2 can be suppressed and further depression of the accelerator pedal 2 in accordance with the driver's wishes can be accomplished smoothly.

Figure 7:
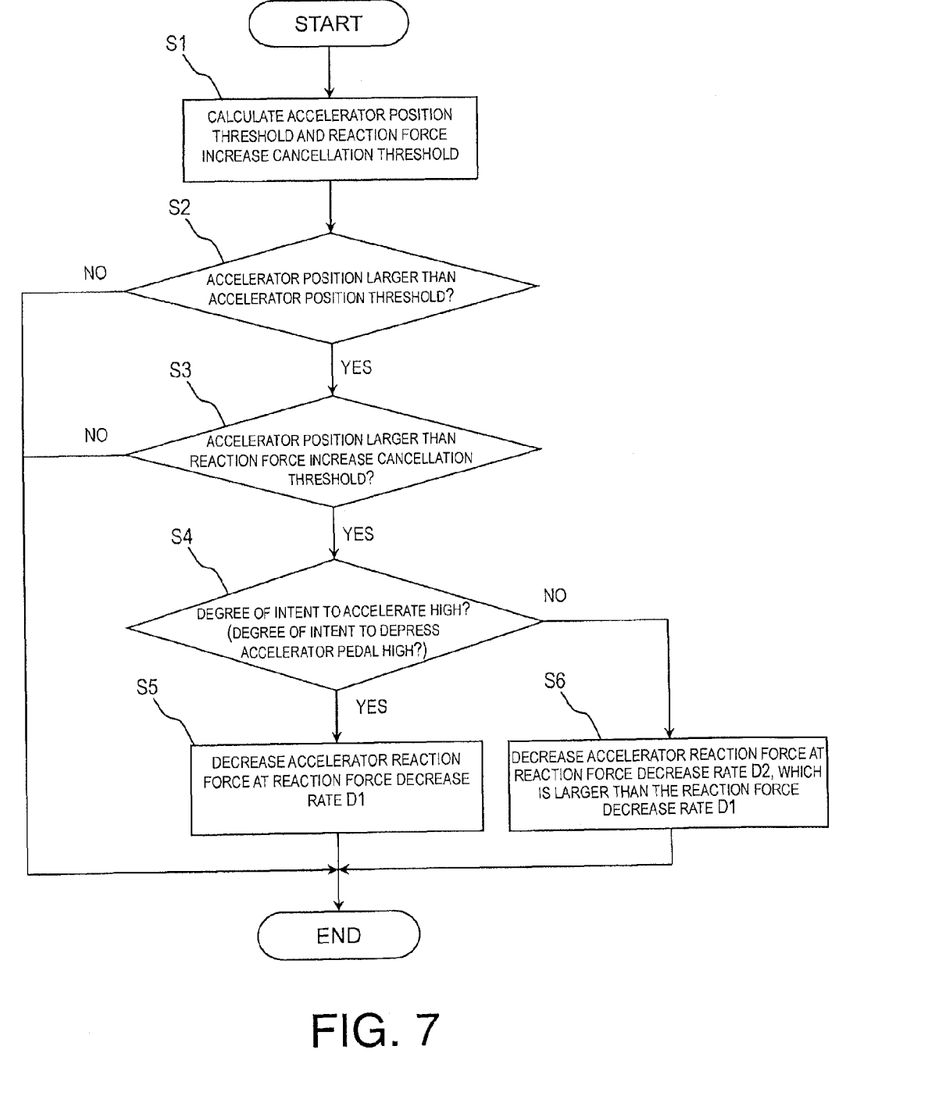
FIG. 7 is a flowchart of an accelerator pedal reaction force control according to the illustrated embodiment.

FIG. 7 is a flowchart showing steps of an accelerator pedal reaction force control according to this embodiment (the steps are executed repeatedly, once per prescribed period of time) in which a decrease rate of a reaction force of an accelerator pedal 2 is changed in two stages In step S1, the control unit 10 calculates an accelerator position threshold and a reaction force increase cancellation threshold.

In step S2, the control unit 10 determines if the accelerator position is equal to or larger than the accelerator position threshold. If the accelerator position is equal to or larger than the accelerator position threshold, then the control unit 10 proceeds to step S3. If not, then the control unit 10 ends the current cycle of the routine. In other words, in step S2, the control unit 10 determines if the reaction force of the accelerator pedal 2 is larger than a base reaction force (i.e., if reaction force increase control is in process). If the reaction force of the accelerator pedal 2 is larger than the base reaction force (reaction force increase control in progress), then the control unit proceeds to step S3. If not, then the control unit ends the current cycle of the routine.

In step S3, the control unit 10 determines if the accelerator position is equal to or smaller than the reaction force increase cancellation threshold. If the accelerator position is equal to or smaller than the reaction force increase cancellation threshold, then the control unit 10 proceeds to step S4. If not, then the control unit 10 ends the current cycle of the routine.

In step S4, the control unit 10 determines if the driver has a high degree of intent to accelerate, i.e., if the driver has a high degree of intent to depress the accelerator pedal 2. If the driver has a high degree of intent to accelerate, i.e., if a change amount of the accelerator position is oriented in an increasing direction, then the control unit 10 proceeds to step S5. If the driver does not have a high degree of intent to accelerate, i.e., if a change amount of the accelerator position is oriented in a decreasing direction, then the control unit 10 proceeds to step S6.

In step S5, since the driver has a high degree of intent to accelerate, the control unit 10 decreases the reaction force of the accelerator pedal 2 at a reaction force decrease rate D1. Meanwhile, in step S6, since the driver does not have a high degree of intent to accelerate, the control unit 10 decreases the reaction force of the accelerator pedal 2 at a reaction force decrease rate D2 that is larger than the reaction force decrease rate D1.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An accelerator apparatus comprising:
    an accelerator device;
    an accelerator device position sensor that detects an accelerator device position of the accelerator device; and
    a reaction force controller that adjusts a reaction force of the accelerator device, the reaction force controller being configured to
        set a first position threshold based on an operating state,
        set a second position threshold that is equal or less than the first position threshold,
        increase the reaction force in response to the accelerator device passing the first position threshold,
        reduce the reaction force at a reaction force decrease rate to return to the base reaction force in response to the accelerator device being reduced to a position below the second position threshold from a position above the first position threshold, and
        vary the reaction force decrease rate based on a change condition of the accelerator device position indicating a rate at which the accelerator device moves past a reaction force increase cancellation threshold at a time as the accelerator device is reduced to a position below the second position threshold.

2. The accelerator apparatus as recited in claim 1, wherein the reaction force controller is further configured such that the change condition of the accelerator device position is a change rate of the accelerator device position occurring as the accelerator device is reduced to the position below the second position threshold which corresponds to the reaction force increase cancellation threshold.

3. The accelerator apparatus as recited in claim 1, wherein the reaction force controller is further configured to set the reaction force decrease rate to be smaller as a change rate of the accelerator device position is positive than as the change rate of the accelerator device position is negative.

4. The accelerator apparatus as recited in claim 1, wherein the reaction force controller is further configured to set the second position threshold to be less than the first position threshold.

5. The accelerator apparatus as recited in claim 1, wherein the second position threshold is different from the reaction force increase cancellation threshold.

6. The accelerator apparatus as recited in claim 1, wherein the reaction force controller further sets the reaction force decrease rate as the accelerator device position becomes equal to or smaller than the reaction force increase cancellation threshold such that the reaction force decrease rate is set to a smaller value in situations where an accelerator device actuation amount is increasing than situations where the accelerator device actuation amount is decreasing.

7. The accelerator apparatus as recited in claim 1, wherein the reaction force controller further sets the reaction force decrease rate as the accelerator device position becomes equal to or smaller than the reaction force increase cancellation threshold such that as the accelerator device actuation amount is increasing at a larger rate, the reaction force decrease rate is set to become smaller.

8. The accelerator apparatus as recited in claim 1, wherein the reaction force controller further sets the reaction force decrease rate as the accelerator device position becomes equal to or smaller than the reaction force increase cancellation threshold such that as the accelerator device actuation amount is decreasing at a larger rate, the reaction force decrease rate is set to become larger.

9. The accelerator apparatus as recited in claim 1, wherein the reaction force controller further sets the reaction force as the accelerator device position becomes equal to, or smaller than the reaction force increase cancellation threshold such that in situations where the accelerator device actuation amount is decreasing, the reaction force returns to the base reaction force in stepped manner.

10. The accelerator apparatus as recited in claim 1, wherein the reaction force controller further sets the reaction force decrease rate as the accelerator device position becomes equal to or smaller than the reaction force increase cancellation threshold such that the reaction force decrease rate is set to a smaller value in situations where the accelerator device was operated based on a driver's intent to accelerate than situations where the accelerator was operated based on a driver's intent to decelerate.

11. The accelerator apparatus as recited in claim 1, wherein the reaction force controller further varies the reaction force increase cancellation threshold in accordance with at least one of a vehicle drive force, a traveling resistance and a vehicle speed.

12. The accelerator apparatus as recited in claim 1, wherein the reaction force controller further varies the reaction force increase cancellation threshold in accordance with a vehicle speed such that the reaction force increase cancellation threshold is set to correspond to a smaller accelerator device position as the vehicle speed is lower than as the vehicle speed is higher.

* * * * *